(12) United States Patent
Murakami

(10) Patent No.: US 7,265,387 B2
(45) Date of Patent: Sep. 4, 2007

(54) DISPLAY DEVICE

(75) Inventor: Katsuaki Murakami, Kikuchi-gun (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 14 days.

(21) Appl. No.: 11/266,324

(22) Filed: Nov. 4, 2005

(65) Prior Publication Data
US 2006/0157704 A1    Jul. 20, 2006

(30) Foreign Application Priority Data
Jan. 14, 2005  (JP) .............................. 2005-007976

(51) Int. Cl.
*H01L 29/04* (2006.01)
(52) U.S. Cl. .................... 257/59; 257/72; 257/258; 349/42; 349/147
(58) Field of Classification Search ............. None
See application file for complete search history.

(56) References Cited

U.S. PATENT DOCUMENTS

| | | | |
|---|---|---|---|
| 6,924,859 B2 * | 8/2005 | Ishii et al. ............... | 349/114 |
| 7,110,068 B2 | 9/2006 | Asuma et al. | |
| 2005/0094067 A1 * | 5/2005 | Sakamoto et al. .......... | 349/114 |

FOREIGN PATENT DOCUMENTS

| | | |
|---|---|---|
| JP | 11-281992 | 10/1999 |
| JP | 2000-122093 | 4/2000 |
| JP | 2004-61891 | 2/2004 |
| TW | 549178 | 6/2004 |

* cited by examiner

*Primary Examiner*—Evan Pert
*Assistant Examiner*—Tan Tran
(74) *Attorney, Agent, or Firm*—Oblon, Spivak, McClelland, Maier & Neustadt, P.C.

(57) ABSTRACT

The present invention provides a display device including a scanning line (3) formed on an insulating substrate, an auxiliary capacitance line (4), a signal line (8), a gate electrode (2) connected to the scanning line, a source electrode (7) connected to the signal line, a switching element (1) formed of the source electrode and a drain electrode (9) formed opposing the source electrode, a reflective electrode (10) and a transmissive electrode (13) that are connected to the switching element, wherein an independent strip conductor formed of a conductive film in the same layer as that for the scanning line and the auxiliary capacitance line is formed in the vicinity of the signal line within the reflective region including the reflective electrode, the independent strip conductor being connected to the drain electrode.

3 Claims, 4 Drawing Sheets

F I G. 3
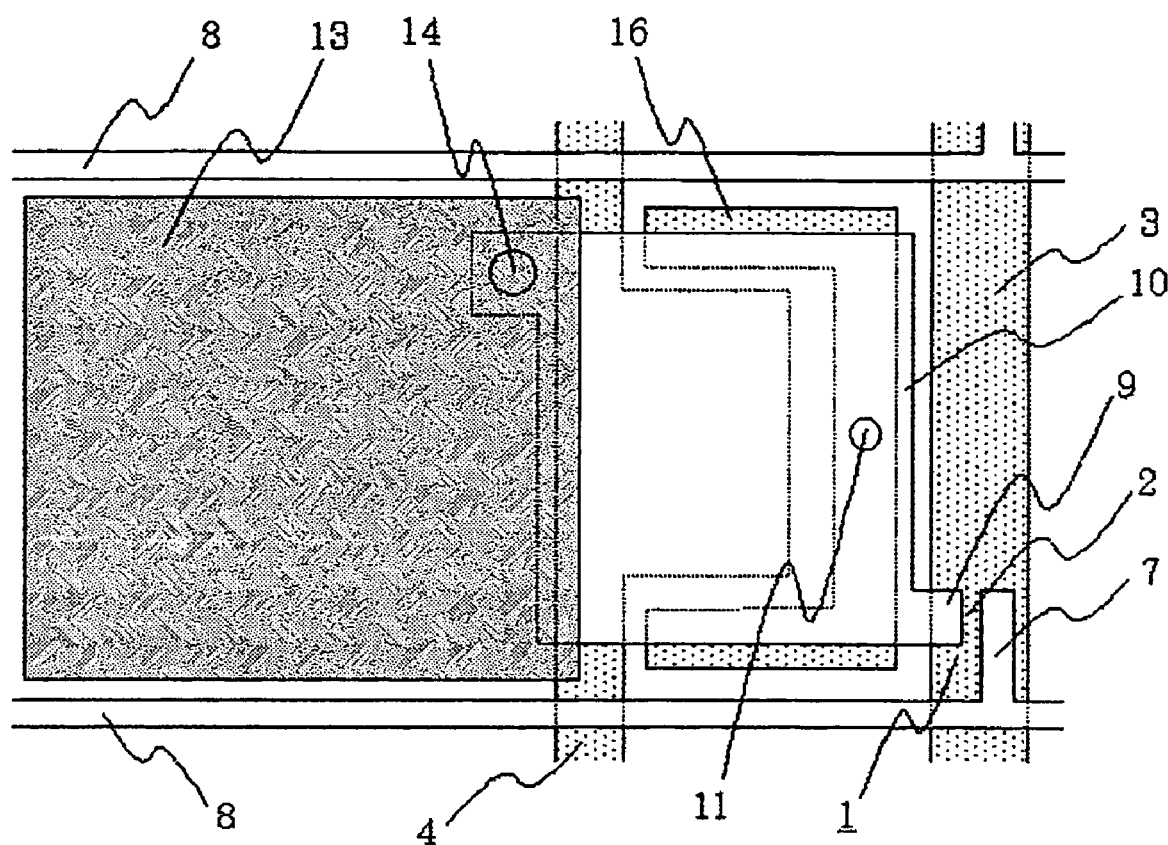

F I G. 4
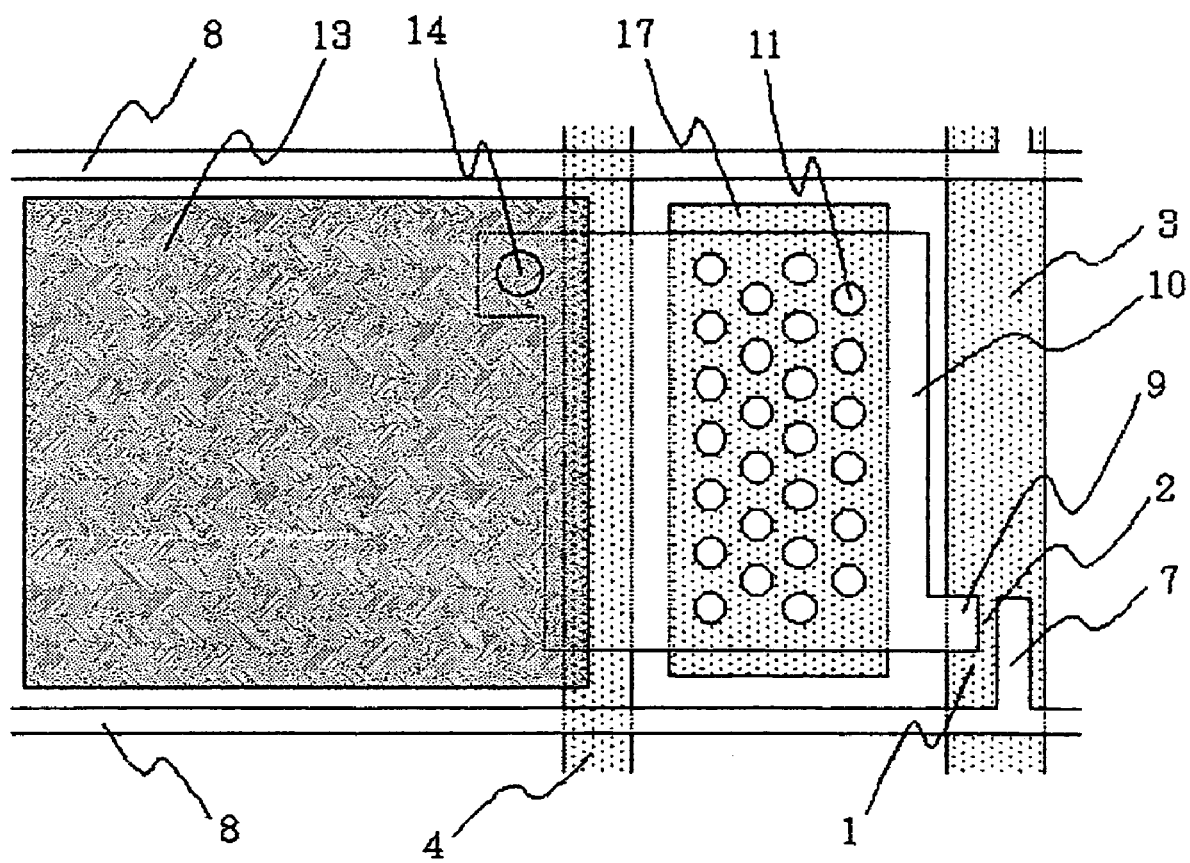

DISPLAY DEVICE

BACKGROUND OF THE INVENTION

1. Field of the Invention

The present invention relates to display devices in which pixel defects can be restored, and is suitably applicable to liquid crystal display devices, in particular.

2. Description of the Related Art

In recent years, as exemplified by a cellular phone, mobile information-terminal devices have rapidly been developing; what are required in these mobile terminal devices are that they are compact and can be driven for a long time. In this situation, among display devices that dissipate electric power most, so-called semi-transmissive display devices have been drawing attention, in which, in a dark environment, display is implemented as usual with a back light, and, in a bright environment, display is implemented by utilizing light from the surrounding environment, in stead of a back light, whereby the power consumption can be saved.

Japanese Laid-Open Patent Publication No. 1999-281992 discloses a semi-transmissive liquid crystal display device in which an interlayer insulating film made of an organic resin film is formed, an unnecessary portion of the interlayer insulating film, such as a drain contact hole, is removed by utilizing the photolithography technology, a transmissive-electrode material is formed, a transmissive electrode is formed by utilizing the photolithography technology to pattern the transmissive-electrode material, thereafter, a reflective-electrode material is formed, and a reflective electrode is formed by utilizing the photolithography technology to pattern the reflective-electrode material.

In the foregoing conventional semi-transmissive liquid crystal display device, the reflective electrode is formed in a layer other than layers for other signal lines; however, the reflective electrode may be formed with conductive film situated in the same layer as those for other signal lines (e.g., the source line) so that production efficiency is enhanced. In the case of a display device such as this, within one pixel, the source line and the reflective electrode are formed with conductive films situated in the same layer; thus, the space between the source line and the reflective electrode should be set to be the same or larger than a predetermined value. In a conventional display device such as this, in the case where, especially in a reflective region formed of a reflective electrode, display based on reflected light is implemented, there has been a problem in that a liquid crystal existing in a space (a region to which no drain voltage is applied; referred to as an ineffective region, hereinafter) between the source line and the reflective electrode deteriorates display quality, for example, by causing light leakage of a back light, due to abnormal orientation caused by no desired voltage being applied to the liquid crystal, thereby deteriorating the contrast, and by causing defective display due to an unintentional voltage being applied to the liquid crystal. In order to prevent such deterioration of the display quality, the problem has been treated, for example, by expanding a transmissive electrode in a transmissive region and providing the transmissive electrode in the vicinity (ineffective region), of the source line in the reflective region, that causes the light leakage.

However, in general, the expanded portion of the foregoing transmissive electrode is often arranged on the top layer of a substrate, and, in that case, the expanded portion is arranged also in the reflective region; therefore, in the case where an opposing substrate (color filter substrate) is attached that is provided in such a way that a liquid crystal layer is sandwiched between the opposing substrate and the insulating substrate, the space between the opposing substrate and the expanded portion of the transmissive electrode in the reflective region becomes narrower than other portions. Accordingly, there has been a problem in that, in the case where a foreign material or the like is sandwiched between the insulating substrate and the opposing substrate, the foreign material creates a short-circuit between the transmissive electrode in the topmost layer in the reflective region on the insulating substrate and the opposing substrate, whereby the probability of a point defect is raised.

SUMMARY OF THE INVENTION

The present invention has been implemented in consideration of these problems; it is an object of the present invention to suppress occurrence of defective display caused by a foreign material that exists in the space between the insulating substrate and the opposing substrate, thereby providing a display device having high quality of display.

In order to achieve the object, the present invention provides a display device including a scanning line formed on an insulating substrate, an auxiliary capacitance line formed in parallel with the scanning line, a signal line situated above and intersecting, through insulating film, with the scanning line and the auxiliary capacitance line, a gate electrode connected to the scanning line, a source electrode connected to the signal line, a switching element formed of the source electrode and a drain electrode formed opposing the source electrode, a reflective region formed of a reflective electrode connected to the switching element, a transmissive region formed of a transmissive electrode connected to the switching element, and an opposing substrate provided opposing the insulating substrate, wherein an independent strip conductor formed of a conductive film in the same layer as that for the scanning line and the auxiliary capacitance line is formed in the vicinity of the signal line within the reflective region, the independent strip conductor being connected to the reflective electrode formed by expanding the drain electrode.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 3 is a plan view illustrating approximately one pixel of a semi-transmissive liquid crystal display device according to Embodiment No. 2 of the present invention; and FIG. 4 is a plan view illustrating approximately one pixel of a semi-transmissive liquid crystal display device according to Embodiment No. 3 of the present invention.

DETAILED DESCRIPTION OF THE PREFERRED EMBODIMENTS

Figure 1:
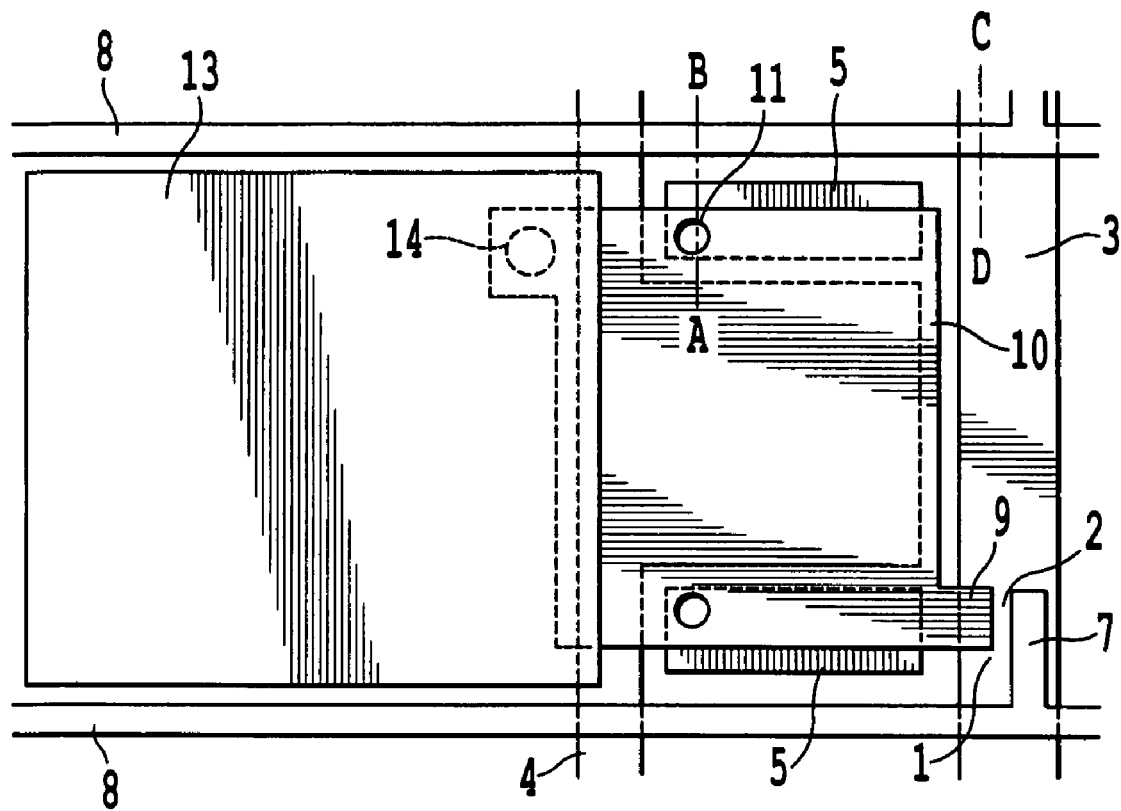
FIG. 1 is a plan view illustrating approximately one pixel of a semi-transmissive liquid crystal display device according to Embodiment No. 1 of the present invention.

Preferred embodiments of the present invention will now be described referring to the drawings.

Embodiment No. 1

Figure 2A:
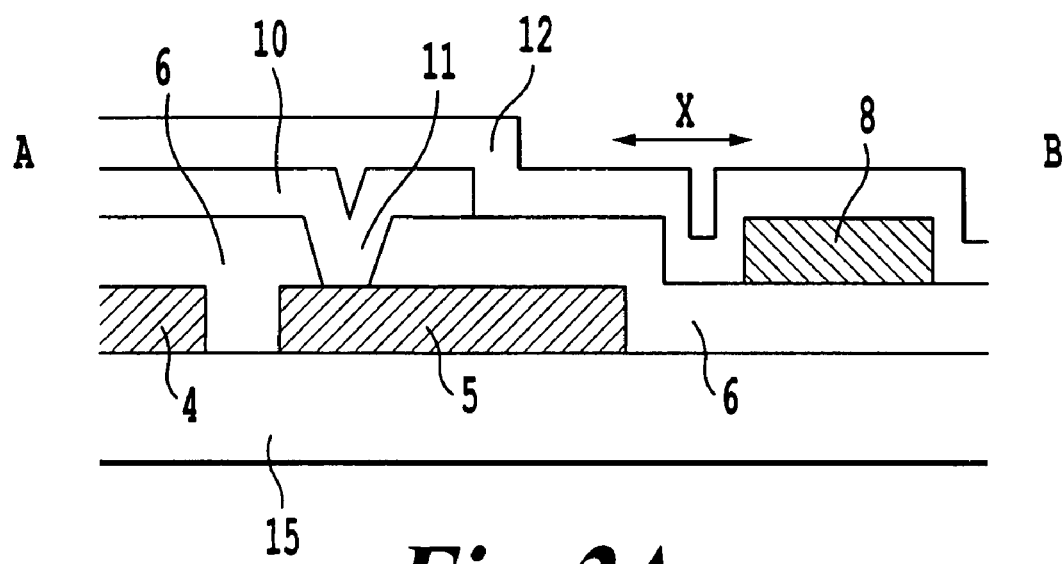
FIGS. 2A and 2B are cross-sectional views, taken along the planes A-B and C-D, respectively, in FIG. 1, of a semi-transmissive liquid crystal display device according to Embodiment No. 1 of the present invention.
Figure 2B:
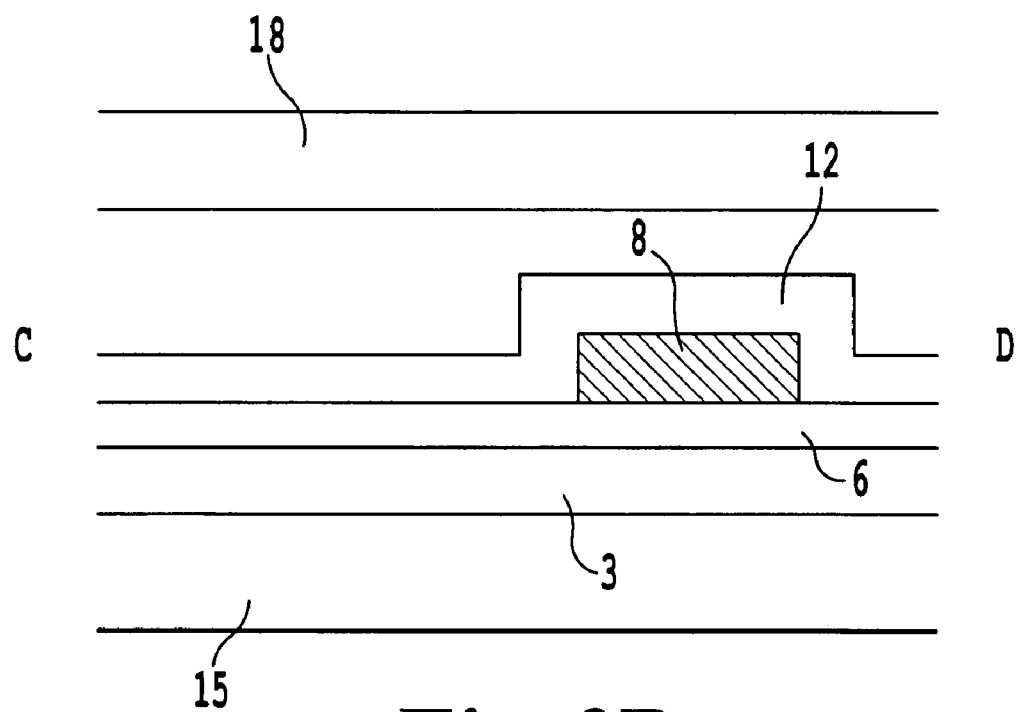

Embodiment No. 1 of the present invention will be explained, referring to FIGS. 1 to 2B. FIG. 1 is a plan view illustrating approximately one pixel of a semi-transmissive liquid crystal display device according to Embodiment No. 1 of the present invention;

FIGS. 2A-B are cross-sectional views taken along the planes A-B and C-D, respectively, in FIG. 1.

As in FIGS. 1 through 2B, a scanning line (gate line) 3 that is connected to a gate electrode 2 of a switching element 1 is formed on an insulating substrate 15. At the same time, an auxiliary capacitance line 4 that is formed in parallel with the scanning line 3 and an independent strip conductor 5 that is formed independent from the scanning line 3 and the auxiliary capacitance line 4 are formed. FIG. 2A shows that the capacitance line 4 and the independent strip conductor 5 are formed on the substrate 15 and FIG. 2B shows that the scanning line 3 is also formed on the substrate 15. As a conductive film for the scanning line, for example, a thin film made of Al, Cr, Cu, Ta, Mo, an alloy of one of Al, Cr, Cu, Ta, or Mo and another material, or the like, is utilized. Thereafter, an insulating film 6 is formed through a film-formation device such as a plasma CVD over the capacitance line 4, the independent strip conductor 5. and the scanning line 3. As the insulating film 6, SiNx, SiOx, SiOxNy, or multilayer film made up of SiNx, SiOx, and SiOxNy, is utilized. Furthermore, a signal line (source line) 8 that is connected to a source electrode 7 is formed. At the same time, a drain electrode 9 that is formed opposing the source electrode 7 and a reflective electrode 10 that is an expanded drain electrode are formed; the reflective electrode 10 forms a reflective region.

As a conductive film for the signal line, for example, a thin film made of Al, Cr, Cu, Ta, Mo, an alloy of one of Al, Cr, Cu, Ta, or Mo and another material, a multilayer formed of different kinds of metals, or a material whose composition varies along the direction of its film thickness, may be utilized; however, because, in Embodiment No. 1, the conductive film forms the reflective electrode, it is preferable to utilize a conductive film including Al that has high reflective efficiency. In addition, while the signal line is formed, the reflective electrode 10 and the independent strip conductor 5 are connected to each other, by means of a contact hole 11 formed in the insulating film 6. Accordingly, the independent strip conductor 5 and the drain electrode 9 are connected to each other; thus, a drain potential is supplied to the independent strip conductor. In the present specification, "reflective region" in one pixel denotes a region that is formed including the reflective electrode 10, and occupies most of the right half of FIG. 1; "transmissive region" in one pixel denotes a region that is formed including the transmissive electrode 13, transmits light, and occupies most of the left half of FIG. 1.

Thereafter, a protective film 12 made of a material similar to that for the insulating film 6 is formed, and then a transmissive electrode 13 that is supposed to form the transmissive region is formed. As the transmissive electrode, transparent metal such as ITO or SnO.sub.2 is utilized. The transmissive electrode 13 and the reflective electrode 10 are connected to each other by means of a contact hole 14 formed in the protective film 12. By attaching, interposing a liquid crystal layer, the insulating substrate completed as described above to an opposing substrate 18 as shown in FIG. 2B that is provided opposing the insulating substrate, a liquid crystal display device is completed.

The foregoing configuration enables a drain potential (that is applied to the reflective electrode and the transmissive electrode) to be supplied to the independent strip conductor formed of a conductive film (in the same layer as that for the scanning line and the auxiliary capacitance line) in a layer different from that for the signal line; therefore, a region where no drain potential is supplied (an ineffective region X in FIG. 2) can be minimized, whereby light leakage due to abnormal orientation of the liquid crystal can be suppressed. Moreover, because, as described above, the independent strip conductor is formed of a conductive film in the same layer as that for the scanning line and the auxiliary capacitance line, a display device having high quality of display can be obtained, without causing any point defect due to a short-circuit between a conductive film on the insulating substrate and the opposing substrate, the short-circuit being caused by a foreign material that exists in the space between the insulating substrate and the opposing substrate.

Still moreover, in Embodiment No. 1, the case has been explained in which, in a reflective region within one pixel, the independent strip conductors 5 are formed in the vicinities of the signal line corresponding to the pixel and the signal line for an adjacent pixel, i.e., the case where, within one pixel, two independent strip conductors are formed; however, regardless of limitation to Embodiment No. 1, one independent strip conductor may be provided only in a region where abnormal orientation of a liquid crystal is especially likely to occur.

Embodiment No. 2

Embodiment No. 2 of the present invention will be explained, referring to FIG. 3. FIG. 3 is a plan view illustrating approximately one pixel of a semi-transmissive liquid crystal display device according to Embodiment No. 2 of the present invention. In FIG. 3, the same functional components as those in FIGS. 1 and 2 are indicated by the same numerals as those in FIGS. 1 and 2; the difference between Embodiment No. 1 and Embodiment No. 2 will be explained.

In Embodiment No. 2, the independent strip conductors 5, in Embodiment No. 1, that are formed with conductive films in the same layer as that for the scanning line and the auxiliary capacitance line, are integrally formed as a u-shaped independent strip conductor 16 in the reflective region within one pixel. The configuration as described above demonstrates the same effect as that of Embodiment No. 1.

Embodiment No. 3

Embodiment No. 3 of the present invention will be explained, referring to FIG. 4. FIG. 4 is a plan view illustrating approximately one pixel of a semi-transmissive liquid crystal display device according to Embodiment No. 3 of the present invention. In FIG. 4, the same functional components as those in FIGS. 1 through 3 are indicated by the same numerals as those of FIGS. 1 through 3; the difference between Embodiments No. 1 and No. 2 and Embodiment No. 3 will be explained.

In Embodiment No. 3, the independent strip conductors 5, in Embodiment No. 1, that are formed with conductive films in the same layer as that for the scanning line and the auxiliary capacitance line, are formed as large as possible, as an independent strip conductor 17; a plurality of contact holes 11 for connecting the independent strip conductor 17 with the reflective electrode 10 is formed. The configuration as described above enables depressions and protrusions due to the contact holes to be formed on the reflective electrode, whereby reflected light is dispersed; therefore, the viewing angle of a display device can be enlarged. In order to make the dispersion of reflected light more efficient, it is preferable to form as many contact holes 11, having a diameter of 5 to 20 μm, as the manufacturing process can allow.

What is claimed is:

1. A display device including a plurality of pixels, at least one pixel comprising:
   a scanning line formed on an insulating substrate;
   an auxiliary capacitance line formed in parallel with the scanning line;
   a signal line situated above and intersecting, through an insulating film, with the scanning line and the auxiliary capacitance line;
   a switching element including a gate electrode connected to the scanning line, a source electrode connected to the signal line, and a drain electrode formed opposing the source electrode;
   a reflective region including a reflective electrode connected to the switching element;
   a transmissive region including a transmissive electrode connected to the switching element; and
   an opposing substrate provided opposing the insulating substrate, wherein an independent strip conductor formed of a conductive film in the same layer as the scanning line and the auxiliary capacitance line is formed in a vicinity of the signal line within the reflective region, the independent strip conductor being connected to the drain electrode, and the independent strip conductor and the scanning line have upper surfaces flush with each other.

2. The display device according to claim 1, wherein, in the reflective region within said pixel, independent strip conductors are formed in vicinities of both the signal line corresponding to the pixel and a signal line corresponding to an adjacent pixel.

3. The display device according to claim 1, wherein, the independent strip conductor and the drain electrode are connected to each other, through contact holes, and a plurality of the contact holes being formed in the reflective region, in order to disperse reflected light.

* * * * *